(12) United States Patent
Watanabe et al.

(10) Patent No.: US 6,708,560 B2
(45) Date of Patent: Mar. 23, 2004

(54) MEASUREMENT APPARATUS FOR MEASURING PHYSICAL QUANTITY SUCH AS FLUID FLOW

(75) Inventors: Izumi Watanabe, Hitachinaka (JP); Naoki Saito, Tokai-mura (JP); Masayuki Kozawa, Hitachinaka (JP); Keiichi Nakada, Hitachinaka (JP); Kei Ueyama, Hitachinaka (JP)

(73) Assignees: Hitachi, Ltd., Tokyo (JP); Hitachi Car Engineering Co., Ltd., Ibaraki (JP)

( * ) Notice: Subject to any disclaimer, the term of this patent is extended or adjusted under 35 U.S.C. 154(b) by 0 days.

(21) Appl. No.: 09/790,689

(22) Filed: Feb. 23, 2001

(65) Prior Publication Data

US 2002/0023486 A1 Feb. 28, 2002

(30) Foreign Application Priority Data

Feb. 23, 2000 (JP) ........................................ 2000-052092

(51) Int. Cl.[7] .................................................. G01F 1/68
(52) U.S. Cl. ................. 73/204.22; 73/202.5; 73/204.26
(58) Field of Search .............................. 73/202, 202.5, 73/204.22, 204.26, 118.2

(56) References Cited

U.S. PATENT DOCUMENTS

| | | | | |
|---|---|---|---|---|
| 4,635,475 A | * | 1/1987 | Jones et al. | 73/204.26 |
| 4,673,652 A | * | 6/1987 | McStravick et al. | 436/2 |
| 4,735,086 A | * | 4/1988 | Follmer | 73/204.19 |
| 5,186,044 A | * | 2/1993 | Igarashi et al. | 73/118.2 |

FOREIGN PATENT DOCUMENTS

| | | |
|---|---|---|
| JP | 6-160204 | 6/1994 |
| JP | 8-285651 | 11/1996 |
| JP | 8-338745 | 12/1996 |
| JP | 11-14423 | 1/1999 |

* cited by examiner

*Primary Examiner*—Harshad Patel
(74) *Attorney, Agent, or Firm*—Crowell & Moring LLP

(57) ABSTRACT

Resin members, on the surfaces of which metal films are formed, are used for; an auxiliary air passage provided in a main air passage, in which a sensor element of a physical quantity sensor such as an air flow sensor, an intake-air temperature sensor, etc., is situated; a housing; and so forth; in order to decrease both the thermal conductivity and the emissivity of those components to respective small values, whereby the temperature increase of the sensor due to both the heat conduction and the heat radiation can be suppressed.

10 Claims, 10 Drawing Sheets

FIG. 17

| No | MATERIAL OF HOUSING MEMBER AND AUXILIARY PASSAGE STRUCTURE MEMBER | | EMISSIVITY *1 | THERMAL CONDUCTIVITY (w/mk) *2 | TEMP. INCREASE OF SENSOR ELEMENT PORTION (°C) *3 |
|---|---|---|---|---|---|
| | PRIMARY PART | COVER FILM | | | |
| 1 | PBT RESIN INCLUDING GLASS BY 30% | NON | 0.94 | 0.21 | 14 |
| 2 | PPS RESIN INCLUDING GLASS BY 50% | NON | 0.92 | 0.27 | 16 |
| 3 | PBT RESIN INCLUDING GLASS BY 30% | Ni PLATING 10μm | 0.16 | 0.83 | 3.6 |
| 4 | PBT RESIN INCLUDING GLASS BY 30% | Ni PLATING 30μm | 0.16 | 2.05 | 4.2 |
| 5 | PBT RESIN INCLUDING GLASS BY 30% | Ni PLATING 100μm | 0.16 | 6.07 | 15 |
| 6 | PBT RESIN INCLUDING GLASS BY 30% | Au PLATING 10μm | 0.12 | 2.32 | 5.2 |
| 7 | ALUMINUM | NON | 0.08 | 236 | 28 |

MEASUREMENT APPARATUS FOR MEASURING PHYSICAL QUANTITY SUCH AS FLUID FLOW

BACKGROUND OF THE INVENTION

The present invention relates to a measurement apparatus for measuring a physical quantity such as fluid flow, pressure, temperature, $O^2$ concentration, etc., and especially to an air flow-measurement apparatus for measuring the flow rate of air taken into an internal combustion engine.

A thermal type flowmeter has been a mainstream of an air flow sensor, which is located in an intake-air passage in an internal combustion engine of a vehicle such as a car, because this type air flow sensor can directly detect a mass flow rate of air.

In the technique of the above thermal type air flow sensor, an auxiliary air passage is formed in an intake-air passage, and a heating resistor element and a temperature sensitive resistor element are situated in the auxiliary air passage as disclosed in Japanese Patent Application Hei 8-338745. Further, by providing radiation fins at the side face of the auxiliary air passage, the temperature of the air flow sensor is prevented from increasing due to the heat generated in an engine.

Moreover, an intake-air temperature sensor, which is located in an intake-air passage, for detecting the temperature of the intake-air, is disclosed in Japanese Patent Application Laid-Open Hei 6-160204. In the embodiments of this application, the temperature sensitive resistor is connected to a metal terminal, which are molded in one body by using a resin mold.

In addition, a sensor in which a part of its support member is a metal plate, is disclosed in Japanese Patent Application Laid-Open Hei 11-14423.

The conventional techniques have the following shortcomings. Usually, resin is used for members composing an auxiliary air passage, a housing, etc., in which a temperature sensitive resistor located in an intake-air passage, a heating resistor, an intake-air temperature sensor, etc., are situated. Since the thermal conductivity of resin is smaller than that of metal and ceramics, resin is proper in the light of preventing the heat generated in an engine from being conducted to the temperature sensitive resistor, the heating resistor, the intake-air temperature sensor, etc., via the outside wall of the intake-air passage. However, although the resin can prevent the temperature of the above sensors from increasing due to the heat conduction, it is not possible to completely prevent the temperature of the above sensors from increasing because the sensors receive the radiation heat from the internal wall of the intake-air passage. In the conventional techniques, the effect of this radiation heat is not absolutely considered.

On the other hand, since the emissivity of metal is greatly smaller than other material, metal is proper to prevent the temperature of the sensors from increasing due to the radiation heat. However, as described above, since the thermal conductivity of metal is large, if the whole of portions such as the auxiliary air passage or housing is made of metal, the heat is conducted to the temperature sensitive resistor, the heating resistor, the intake-air temperature sensor, etc., via the outside wall of the intake-air-passage, which in turn makes it impossible to prevent the temperature increase of the sensors.

SUMMARY OF THE INVENTION

An objective of the present invention is to prevent the deterioration in the detection accuracy by reducing influences of the heat conduction and the heat radiation from the outsides of sensors.

The above objective is achieved by what is claimed by each claim.

BRIEF DESCRIPTION OF THE DRAWINGS

FIG. 17 is another example of the results in the examination of the thermal effects in an engine room.

DETAILED DESCRIPTION OF THE EMBODIMENTS

Hereafter, details of the embodiments will be explained with reference to the drawings.

Figure 1:
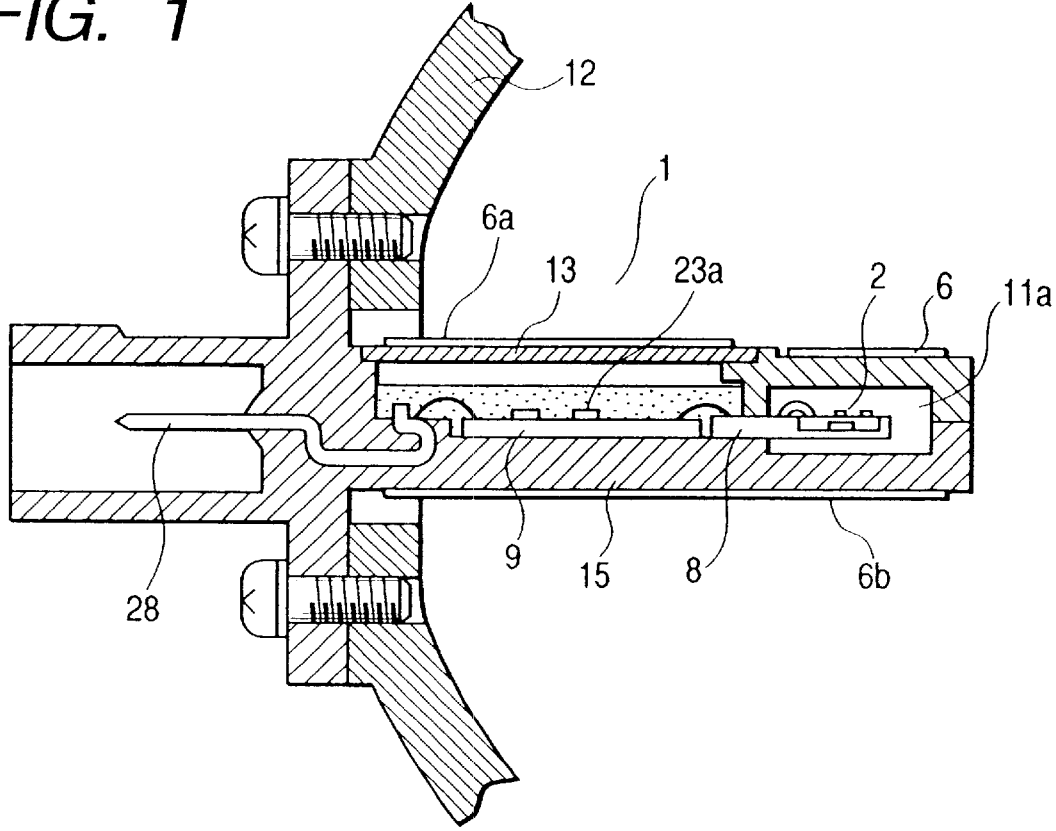
FIG. 1 is a cross sectional view of the structure of a thermal type air flow sensor, including an auxiliary air passage, according to the present invention.
Figure 2:
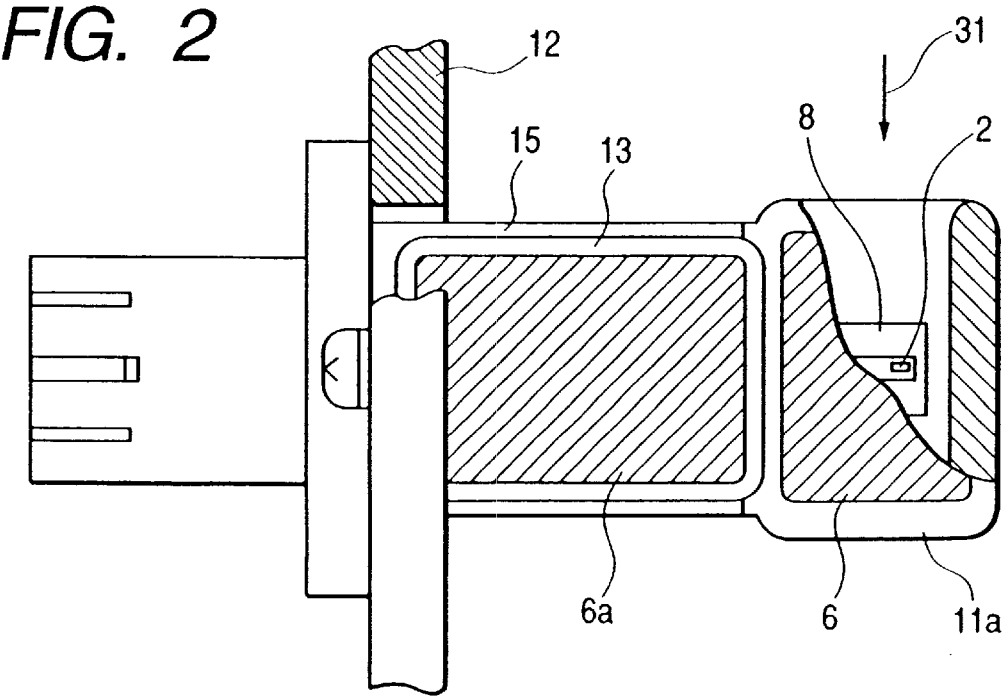
FIG. 2 is a partial cross sectional view of the structure of the thermal type air flow sensor, including an auxiliary air passage, according to the present invention.

FIG. 1 shows a cross sectional view of the structure of a thermal type air flow sensor of the first embodiment according to the present invention. Further, FIG. 2 shows a plan view of the structure of the thermal type air flow sensor shown in FIG. 1. As shown in FIG. 1 and FIG. 2, the thermal type air flow sensor 1 includes a semiconductor sensor element 2, a substrate 8 for supporting the semiconductor sensor element 2, an auxiliary air passage 11a, metal terminals 28 for outputting signals to and inputting signals from an external circuit, etc. The air flow direction is shown by arrow 31 in FIG. 2. Further, a diaphragm composed of an electrical insulating film is formed in the back surface part of a semiconductor substrate by an anisotropic etching method, and the semiconductor sensor element 2 which includes a heating resistor 3 formed on the diaphragm, and a temperature sensitive resistor 4 formed on the semiconductor substrate, for measuring the temperature of intake-air. A control circuit 23a mounted on a circuit board 9 controls resistor-heating current which flows in the heating resistor 3 so as to hold the temperature of the heating resistor 3 higher by a predetermined value than that of the temperature sensitive resistor 4. The intake-air flow rate signal is obtained based on the resistor-heating current. When the inside wall of main air passage 12 is heated by receiving the heat generated in an engine, the heat is conducted to a housing 15, a cover 13, and the auxiliary air passage 11a from the inside wall main air passage 12, and further to the semiconductor sensor element 2. Furthermore, when the inside wall of main air passage 12 is heated, the above members are also heated by the heat radiation from the inside wall of the main air passage 12, and the heat is further conducted to the semiconductor sensor element 2. Accordingly, the temperature of the temperature sensitive resistor 4 becomes higher than that of the intake-air, and this causes an error of a signal output from the semiconductor sensor element 2. Moreover, the quantity of heat dissipation from the heating resistor 3 changes due to the temperature increase of the semiconductor sensor element 2, and this also causes an error of the signal output from the semiconductor sensor element 2. Thus, in the present invention, resin such as PBT (polybutylene terephtalate) resin, PPS (polyphenylene sulfide) resin, and so forth, whose thermal conductivity is small, is used for the housing 15, the cover 13, the wall of the auxiliary air passage 11a, etc., and their surfaces are covered by films 6, 6a, and 6b, made of material of small emissivity.

For example, the members composing the housing 15, the cover 13, and the auxiliary air passage 11a, are made of PBT resin, which includes glass by 30%, of the average thickness of 1.5 mm, and a nickel film of 0.01 mm thickness is coated on their surfaces by an electroless plating method. The thermal conductivity of PBT resin is about 0.21 w/m·k, and it is lower than that of metal or ceramics. Moreover, although the thermal conductivity of nickel films 6, 6a, and 6b, which are metal, is large, since the thickness of the films is very thin, the films hardly change the thermal conductivity of the resin members whose surfaces are covered by the films. In addition, although the emissivity of PBT resin is about 0.94, and is near that of a black body (=1.0), the emissivity of the PBT resin members can be decreased to about 0.16 by covering the surfaces of the resin members with nickel films. In this way, since both the thermal conductivity and the emissivity of the members composing the thermal type air flow sensor can be decreased, the heat which has generated in the engine, only slightly transfers to the semiconductor sensor element 2, and this can suppress an occurrence of a measurement error due to the thermal effects. Meanwhile, emissivity can be measured with an infrared thermometer.

Figure 3:
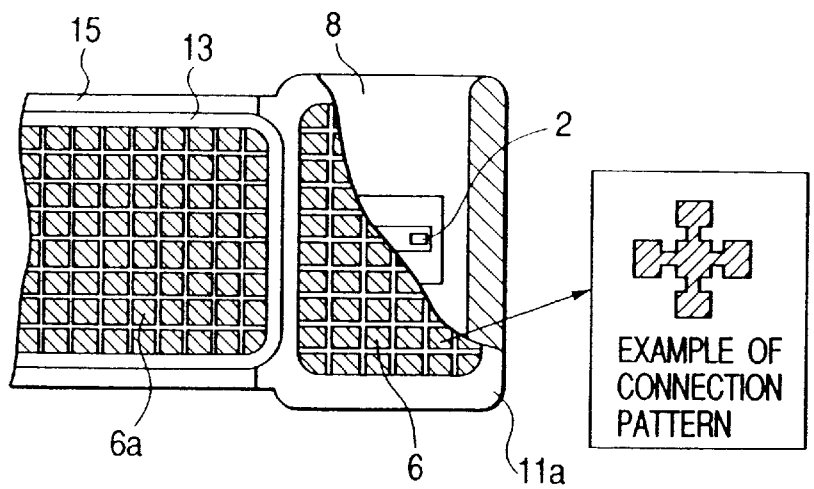
FIG. 3 is a partial cross sectional view of the structure of the thermal type air flow sensor, including an auxiliary air passage, according to the present invention.

If the films 6, 6a, and 6b covers all faces of the respective resin member, it brings a greatly large effect. However, as shown in FIG. 1 and FIG. 2, it also brings a large effect that the films 6, 6a, and 6b cover only side surfaces of the respective resin members, the side surface being in parallel with the inside wall of the main air passage 12, whose areas are large, and which tend to receive the radiation heat. Further, this structure can save nickel metal, and reduce the cost of the air flow sensor. On the other hand, it was found that since the thermal expansion coefficient of nickel film is greatly different from that of PBT resin, when a heat-shock test was performed to the nickel-film coated PBT resin member, the nickel films 6, 6a, and 6b, sometimes fell off from the PBT resin members, or cracks came up in the nickel films 6, 6a, and 6b. One of countermeasures to this problem is to strengthen the adhesiveness of the nickel films 6, 6a, and 6b to the PBT resin members. Another countermeasure is to fabricate the nickel films 6, 6a, and 6b as fine mesh type films (assemblies of flakes) as shown in FIG. 3. Since the generated stress can be more relaxed in the mesh type films 6, 6a, and 6b than in the films 6, 6a, and 6b without any hole in them, the falling-off of the mesh type nickel films or the generation of the cracks in the mesh type nickel films hardly occur, and such mesh type nickel films can keep their good look even if cracks occur in the films. Moreover, by connecting a part or all of the flakes to each other, it is possible to more sufficiently prevent such falling-off. Particularly, it is effective to connect the flakes in the portion at which the speed of air flow is large. Also, it is effective to change the composition of the resin member in a particular position so that the emissivity of this portion become smaller.

Figure 5:
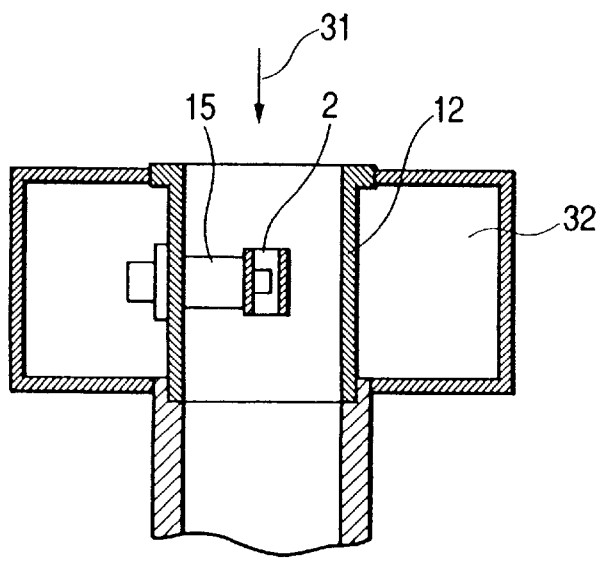
FIG. 5 is a cross sectional view of a test facility for examining thermal effects on a sensor in an engine room.
Figure 6:
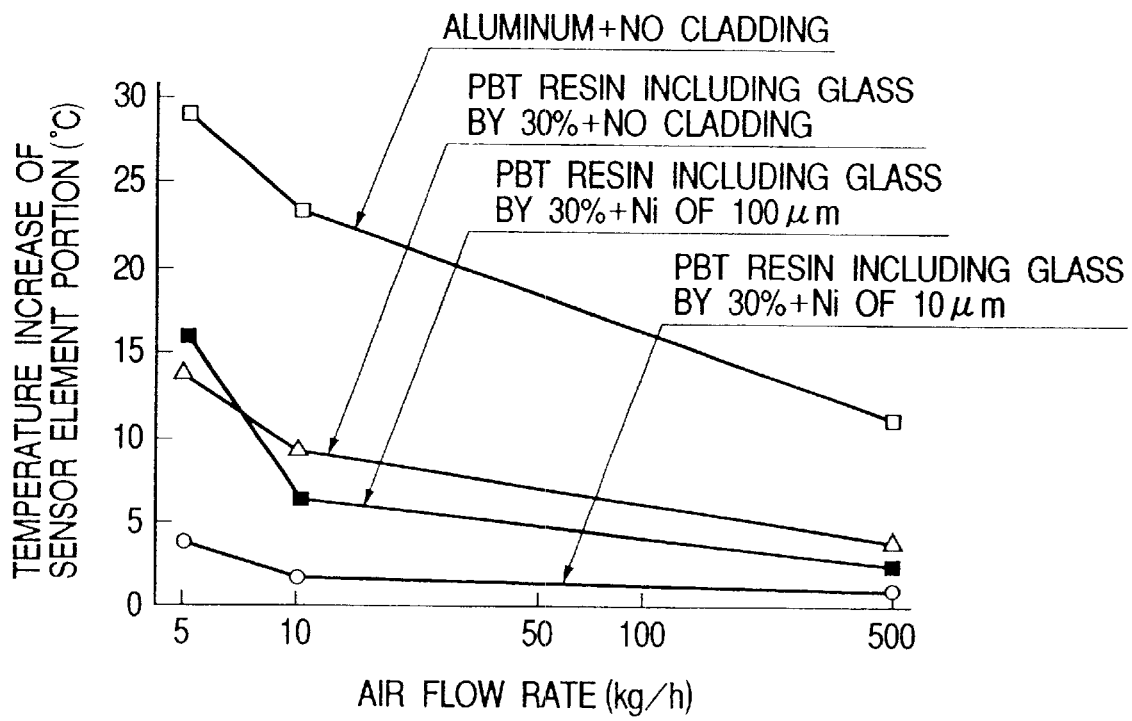
FIG. 6 is an example of results in the examination of the thermal effects on a sensor in an engine room.

FIG. 5 shows the composition of a test facility for examining thermal effects on sensors in an engine room, and the outside wall of the main air passage 12 is surrounded by a constant temperature batch 32. Further, the controlled temperature of the constant temperature bath 32 is set so as to keep the temperature of the outside wall of the main air passage 12 at 80° C., and air of about 20° C. is passed through the main air passage 12. FIG. 17 shows an example of results of the test in which the temperature increase of the semiconductor sensor element 2 was examined with regard to various combinations of; material used for members composing the housing 15 and the auxiliary passage 11a; and material used for the films 6; by using the test facility shown in FIG. 5. Also, FIG. 6. shows an example of results of the test in which the temperature increase of the semiconductor sensor element 2 was examined with regard to various flow rates of air.

If the housing 15 and the auxiliary air passage 11a are made of only resin, the influence of the radiation heat from the inside wall of the main air passage 12 is large, and this causes a large temperature increase of 14° C. On the other hand, if the surfaces of the respective resin members is plated with nickel of 0.01–0.03 mm thickness, the influence of the radiation heat is reduced, and the temperature increase is in just 4° C. However, if the thickness of the nickel plate if larger than 0.1 mm, the temperature increase becomes larger on the contrary. This is because the effect of the thermal conductivity of the nickel plate cannot be neglected if the thickness of the nickel plate is increased. Thus, it is suggested that there is the optimal thickness of the nickel plate (film) 6.

It has been confirmed that even if the nickel thin film of 0.001 mm thickness is formed on the surfaces of the resin members by a vacuum evaporation method or a sputtering method, the small emissivity of the members can be kept. Thus, the optimal thickness of the nickel plate (film) 6 should be less than 0.1 mm.

Although only nickel and gold are shown as the material used for the plate 6 in FIG. 17, other metal such as copper, aluminum, palladium, platinum, tin, silver, zinc, etc., can also bring the same effect.

Although iron, magnesium, nickel-chrome alloy, stainless alloy, etc., also bring a similar effect, since the emissivity of the members tends to increase if material such as the above material, on which an oxide film or a passivation film is easily formed, is used, it is occasionally necessary to provide a countermeasure to the forming of an oxide film or a passivation film.

Here, if the corrosion proof to sulfur, ammonia gas, etc., which is included in air taken into the engine of the car, is considered, it is desirable to use material including nickel, gold, palladium, platinum, tin, zinc, etc., in the above-described material.

Figure 7:
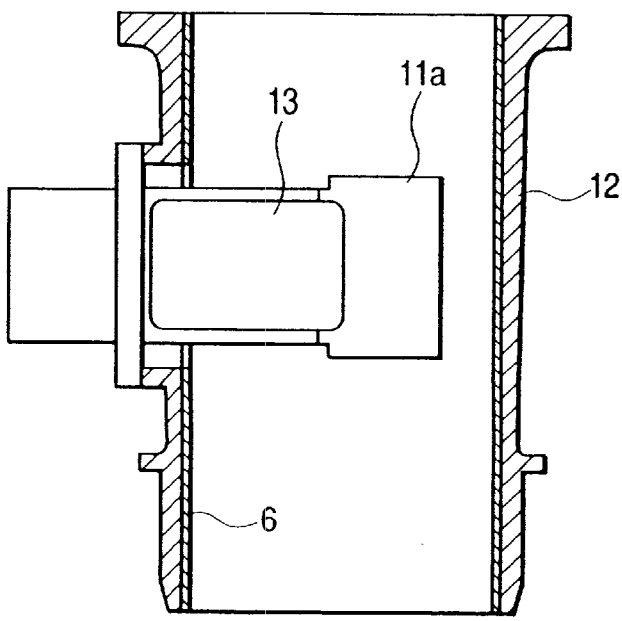
FIG. 7 is a cross sectional view of a thermal type air flow sensor, situated a main air passage, according to the present invention.

FIG. 7 shows the composition of another embodiment. In this embodiment, members composing the wall of a main air passage is made of resin, and a film 6 of small emissivity is coated on the inside surface 12 of the main air passage. Since the kinds of material to be used, and its effect, are the same as those in the above embodiments, their explanations are omitted.

In the thermal type air flow sensor 1 shown in FIG. 1, FIG. 2, FIG. 3, and FIG. 7, the semiconductor sensor element 2 is used as a sensor element. However, it is needless to say that the present invention can be applied to; the structure such as that disclosed in Japanese Patent Application Laid-Open Hei 8-338745, in which an auxiliary air passage is formed in an intake-air passage, and a heating resistor element and a temperature sensitive resistor element are situated in the auxiliary air passage; or the structure such as that disclosed in Japanese Patent Application Laid-Open Hei 8-285651, in which an air flow sensor and an air temperature sensor are integrally formed.

Figure 4:
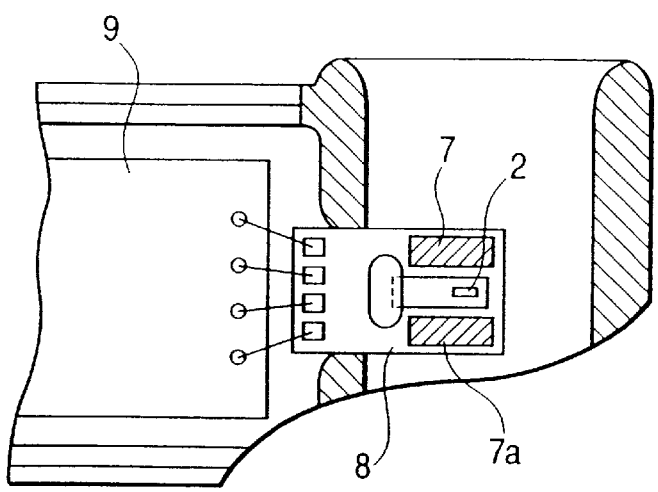
FIG. 4 is a diagram showing the structure of a substrate on which a semiconductor sensor element according to the present invention is mounted.

FIG. 4 shows another embodiment, and metal films 7 and 7a are formed on a substrate 8 on which a semiconductor sensor element 2 is mounted. A ceramic substrate or a resin substrate is used as the substrate 8, and material such as that described above can also be used for the metal films 7 and 7a. Although the metal films 7 and 7a are formed on the surface on which the semiconductor sensor element 2 is mounted, in FIG. 4, forming the metal films 7 and 7a on the back surface of the substrate 8 brings the same effect, and forming metal films on both surfaces shall bring a larger effect.

Figure 18:
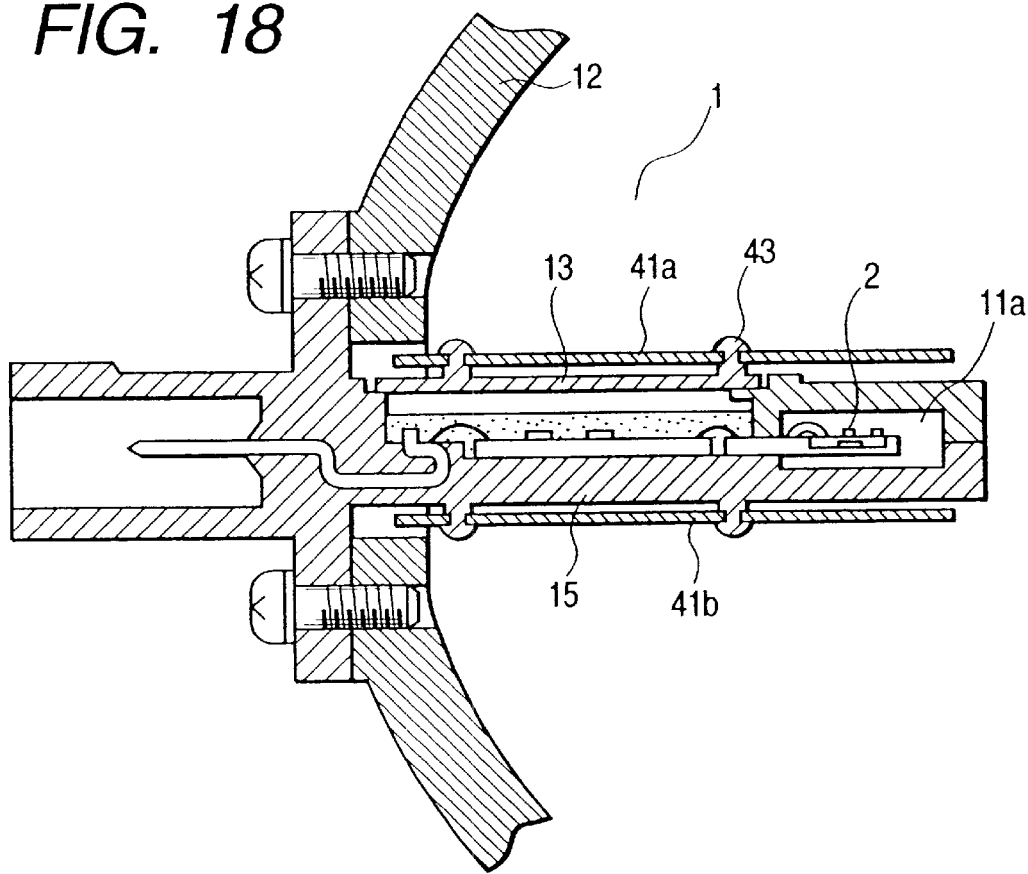
FIG. 18 is a cross sectional view of a housing portion of a thermal type air flow sensor according to the present invention.
Figure 19:
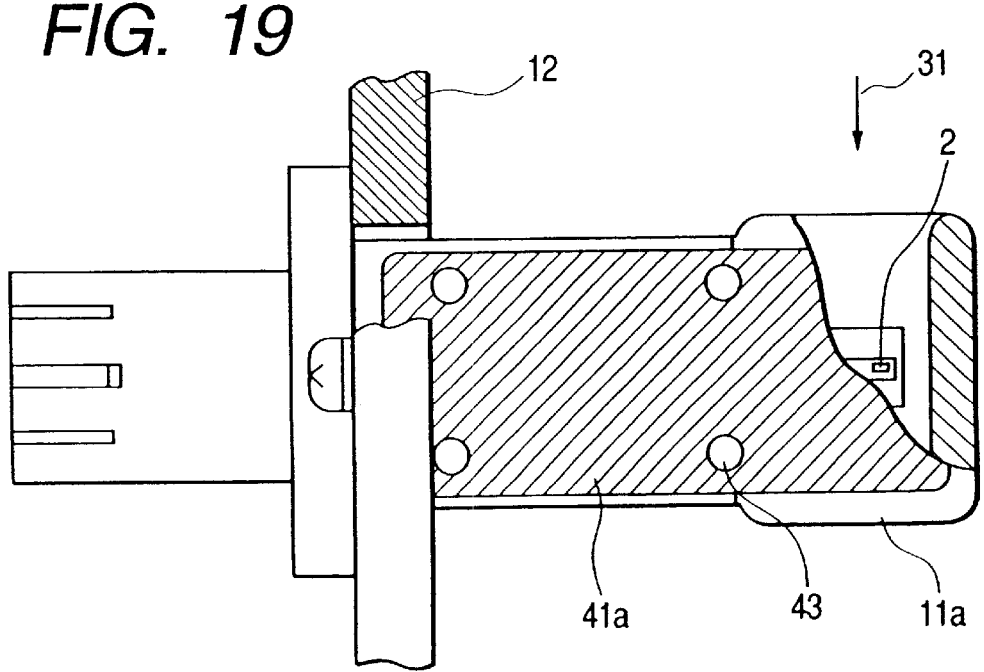
FIG. 19 is a plan and partial cross sectional view of the housing portion of the thermal type air flow sensor according to the present invention.

Further, another embodiment is explained below with reference to FIG. 18 and FIG. 19. FIG. 18 shows a cross sectional view of a thermal type air flow sensor 1 of this embodiment according to the present invention. FIG. 19 shows a plan view of the thermal type air flow sensor 1 shown in FIG. 18.

In this embodiment, in order to reduce the influence of the radiation heat from the inside wall 12 of a main air passage, members made of resin whose thermal conductivity is small, such as PBT resin, PPS resin, etc., are used for the housing 15 containing an auxiliary air passage 11a through which a part of air flowing in the main air passage passes, the cover 13, the auxiliary air passage 11a, etc., and metal skirts 41a and 41b are situated on the surfaces of these members via respective gaps.

Meanwhile, the metal skirts 41a and 41b are fixed to the housing 15 and the cover 13 by putting resin prongs 43 formed on the outer surfaces of these members through holes, formed in the skirts 41a and 41b, and thermally caulking these prongs 43 in the manners of rivet-caulking. Since the metal skirts 41a and 41b are fixed to the members with the resin prongs 43 of small thermal conductivity, the temperature increase of the air flow sensor 1, which is caused by the heat conductivity, is very small. Therefore, plates of 1.5–2 mm thickness can be used for the metal skirt 41a and 41b. Moreover, if the metal skirts 41a and 41b are situated in parallel with the axis of the main air passage, the resistance of air flow to the skirts 41a and 41b can be reduced.

By adopting the above structure of the air flow sensor 1, since the conduction of heat from the inside wall 12 of the main air passage is insulated by the resin members, and the radiation heat is also shielded by the metal skirts 41a and 41b, the temperature increase of the housing 15 can be suppressed. Thus, the thermal influence to the semiconductor sensor element 2 can be prevented. Meanwhile, it is possible to use material other than resin for the skirts 41a and 41b if the emissivity of this material is smaller than the member composing the housings 15.

Figure 20:
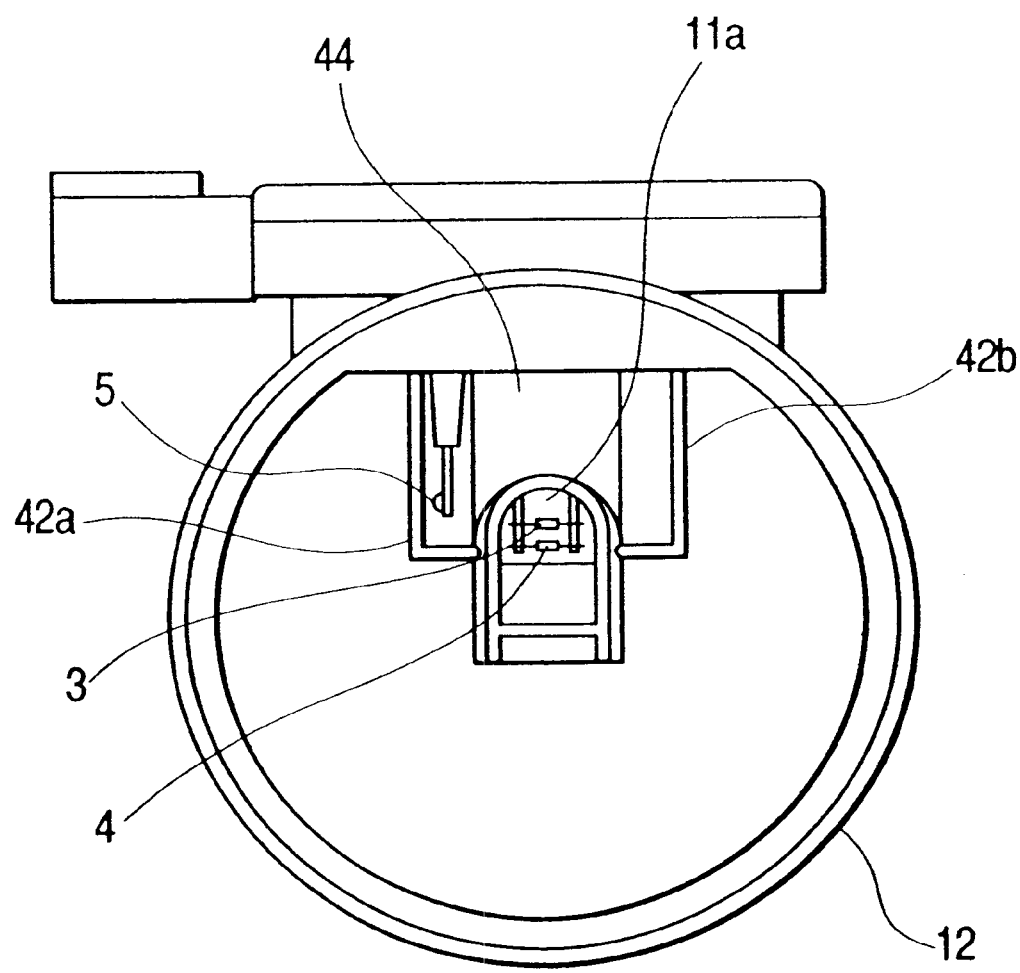
FIG. 20 is a diagram viewed from the upstream of air flow, of a thermal type air flow-sensor according to the present invention.

Further, another embodiment is explained bellow with reference to FIG. 20. In this embodiment as well as in the above embodiment, members made of resin whose thermal conductivity is small, are used for an auxiliary air passage 11a provided in a main air passage and a support portion 44. Also, a heating resistor 3 and a temperature sensitive resistor 4 are situated in the auxiliary air passage 11a. Moreover, resin skirts 42a and 42b are provided at both sides of the support portion 44 and the auxiliary air passage 11a.

Although the temperature of the resin skirts 42a and 42b themselves is increased by the radiation heat from the inside wall 12 of the main air passage, since it is possible to prevent the auxiliary air passage 11a and the support portion 44 from directly being irradiated with the radiation heat, the structure of this embodiment can be expected to bring the same effect as that of the above embodiments.

Furthermore, since the support portion 44 corresponds to the housing 15 shown in FIGS. 18 and 19, it is natural that the structure, not shown diagrammatically, in which the resin skirts 42a and 42b are situated at the housing 15, will bring a similar effect. Meanwhile, the housing 15 and the support portion 44 are described in claims of the present invention, assuming that they indicate the same portion. Also, it is assumed that the cover 13, which is shown in FIG. 1, FIG. 18, indicates the same portion of the housing 15.

In the structure disclosed in Japanese Patent Application Laid-Open Hei 8-285651 in which an air flow sensor and an air temperature sensor are integrally formed, a resin skirt 42a for protecting the air temperature sensor is situated at only one side of a support portion 44. However, this resin skirt 44 is provided not to shield the radiation heat but to mechanically protect the air temperature sensor.

As described in the above embodiments, by providing the resin skirts 42a and 42b at both sides of the support portion, the temperature increase of the sensors due to the radiation heat can be remarkably suppressed. Although an air temperature-detecting resistor 5 is situated at the left side of the support portion 44 shown in FIG. 20, the structure without this air temperature sensor 5 can naturally bring the same effect.

Figure 8:
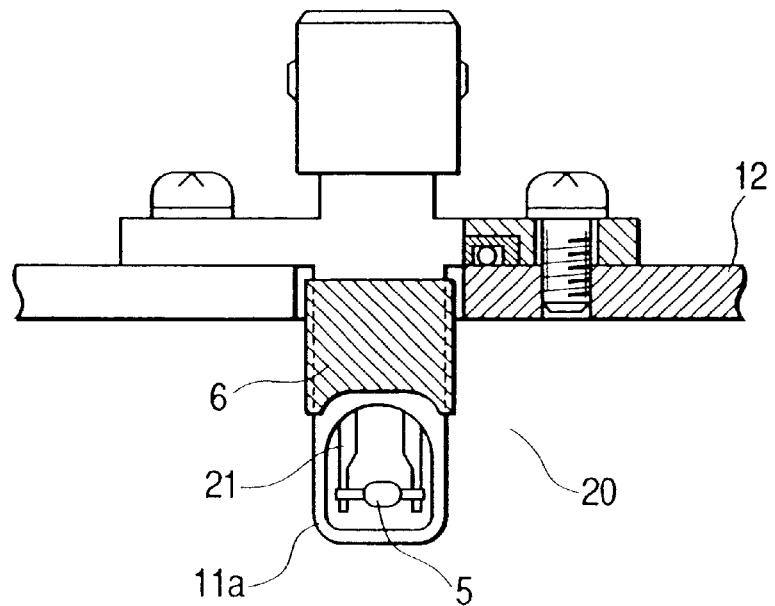
FIG. 8 is a partial cross sectional view of an intake-air temperature sensor, including an auxiliary air passage, according to the present invention.
Figure 9:
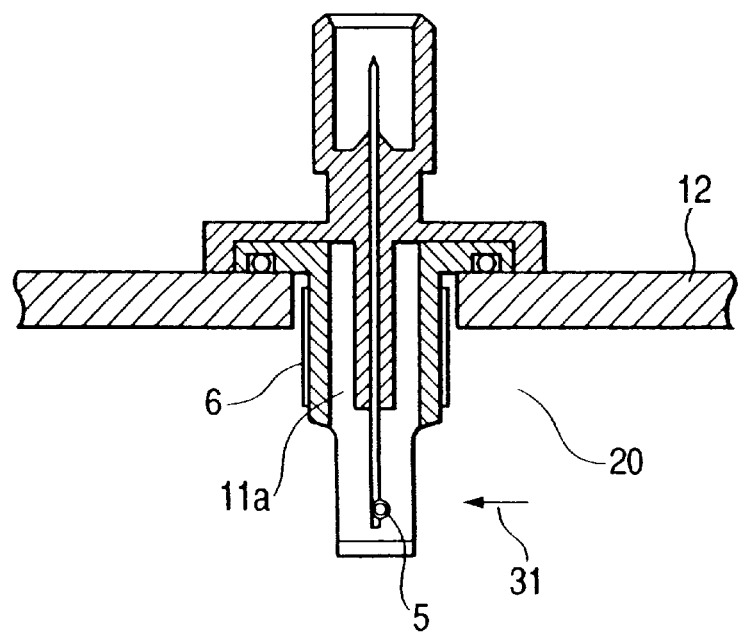
FIG. 9 is a cross sectional view of the intake-air-temperature sensor, including an auxiliary air passage, according to the present invention.

FIG. 8 and FIG. 9 show the structures of respective air temperature sensors 20 to which the present invention is applied. Here, resin members are used for the auxiliary air passage 11a in which the air temperature-detecting resistor 5 retained by support pins 21 is situated, and the auxiliary air passage 11a is covered by a layer made of material whose emissivity is small. By this structure, the temperature increase of the auxiliary air passage 11a can be suppressed, and the influence of the heat transferred to the air temperature-detecting resistor 5 via the auxiliary air passage 11a is further reduced, which in turn can improve the measurement accuracy of the air temperature sensor 20. Meanwhile, since the material of the layer covering the auxiliary air passage 11a is the same as that used in the above embodiments, the explaining of the material is omitted.

Figure 10:
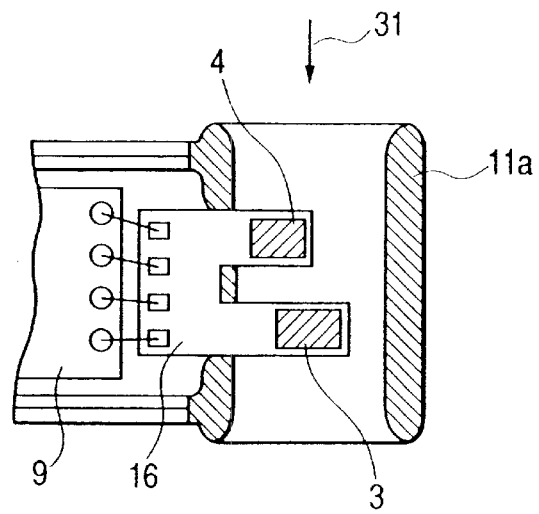
FIG. 10 is an enlarged view of the thermal type air flow sensor including a plate type sensor element according to the present invention.
Figure 11:
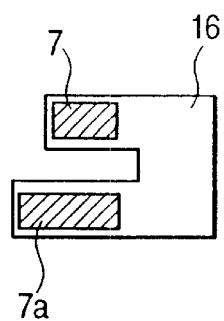
FIG. 11 is an enlarged view of the plate type sensor element according to the present invention.

Further, another embodiment is explained below with reference to FIG. 10 and FIG. 11. FIG. 10 shows the structure of an thermal type air flow sensor 1 using a plate sensor element, a thin substrate 16 using a ceramic plate or a glass plate, on one surface of which a temperature sensitive resistor 4 and a heating resistor 3 are formed, is located in the auxiliary air passage 11a. Further, FIG. 11 shows the back surface of the thin substrate 16 shown in FIG. 11. As shown in FIG. 11, metal films 7 and 7a whose emissivity is smaller than that of ceramics or glass, are formed on the areas opposite to the temperature sensitive resistor 4 and the heating resister 3, of the back surface.

By this structure also, the temperature increase of the temperature sensitive resistor 4 and the heating resistor 3 can be suppressed.

Figure 12:
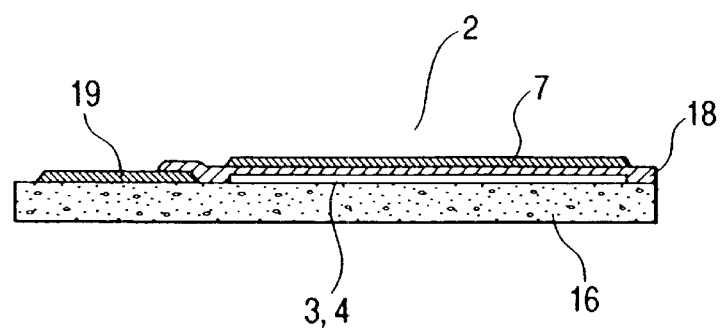
FIG. 12 is a cross sectional view of the plate type sensor element according to the present invention.

FIG. 12 shows the structure of a plate type sensor element 2, in which a metal film 7 of small emissivity is formed on the surface of a cover film 18 for protecting a temperature sensitive resistor 4 and a heating resistor 3 in order to further reduce the temperature increase of the plate type sensor element due to the radiation heat. In this structure, since the temperature increase of the temperature sensitive resistor 4 and the heating resistor 3 can be more surely prevented in comparison with the structure shown by FIG. 10 and FIG. 11, the prevention of the temperature increase is more effectively implemented. Meanwhile, electrodes 19 are conductor films for electrically connecting the temperature sensitive resistor 4 and the heating resistor 3 to the control circuit on the substrate 9. Also, it is possible to form the electrodes 19 by extending conductor members forming the temperature sensitive resistor 4 and the heating resistor 3 to the position at which the electrodes 19 are to be formed.

Here, the present invention is not restricted to a plate type sensor element, and can be applied to the structure of another type sensor element, not shown diagrammatically, in which a thin film made of metal such as platinum is formed on a cylindrical ceramic bobbin, and the thin metal film is covered by a glass cover 18. If a metal film of small emissivity is further formed on the thin metal film, the effect of this structure is the same as that of the above embodiment.

By this structure, the heat generated in the engine is prevented from transferring to the temperature sensitive resistor due to heat conduction via the outside wall of the intake-air passage, and the influence of the radiation heat from the outside wall of the intake-air passage can also be prevented.

Thus, the deterioration in accuracy of the air flow sensor and the air temperature sensor due to the heat influence can be prevented.

Figure 13:
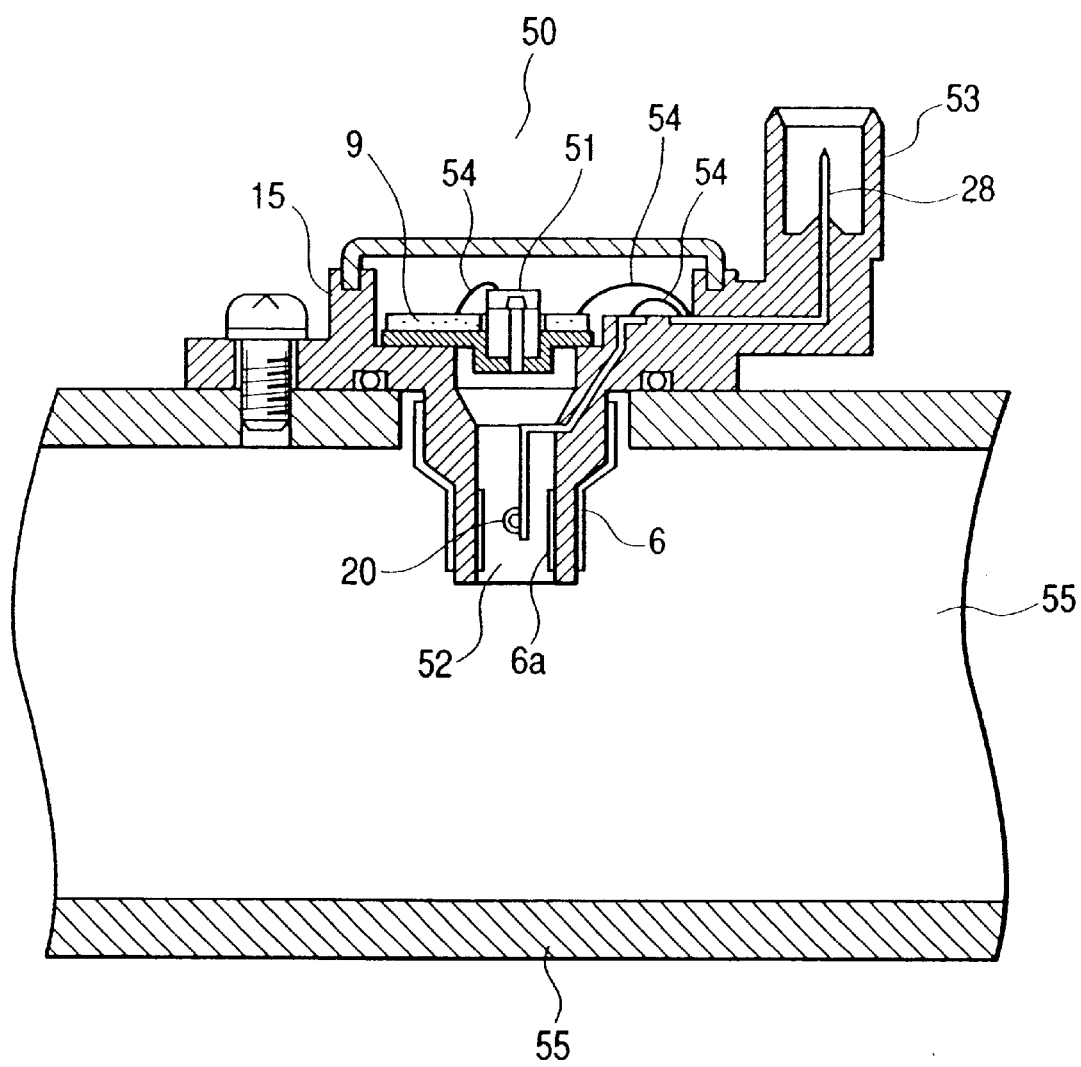
FIG. 13 is a cross sectional view of a pressure sensor according to the present invention.

Further, a pressure sensor 50 of another embodiment according to the present invention is explained below with reference to FIG. 13.

This pressure sensor 50 includes; a gauge portion 51 for converting a pressure signal to an electrical signal; a substrate for a control circuit 9 for amplifying an extremely low level electrical signal, which has been generated in the pressure sensor 50, to the output voltage level of the pressure sensor 50; a resin housing 15 for including the gauge portion 51 and the substrate 9 for the control circuit; and a connector portion 53. Recently, the pressure sensor 50 and an intake-air temperature sensor 20 which are integrally formed, has been devised, and FIG. 13 also shows the structure of the pressure sensor 50 integrally formed along with an intake-air temperature sensor 20. Signals output from the pressure sensor 50 and the intake-air temperature sensor 20 are sent to an external circuit via metal lead wires 54 connected to metal terminals 28.

A diaphragm which is deformed when it receives pressure, is formed in the gauge portion 51 of the pressure sensor 50. A pressure signal is generated by the phenomenon in which the resistor element formed on the diaphragm changes its resistance, according to the piezo electric effect, when it receives pressure. However, the piezo electric effect has temperature dependency, and a pressure signal generated according to the piezo electric effect changes depending on the temperature of a resistor element used. Accordingly, the temperature correction is performed by using a temperature signal from a temperature sensor which is usually mounted on the substrate 9 for the control circuit. However, since the temperature correction cannot completely remove a measurement error due to temperature changes, it is not desirable that the temperature of the pressure sensor highly increases due to the high temperature of the inside wall 55 of the intake-air passage. Particularly, in a measurement apparatus such as the pressure sensor 50 integrated along with the air temperature sensor 20, which measures an air flow rate based on the air pressure and the air temperature, a measurement error in the obtained air flow rate may be large if the temperature of intake-air cannot be accurately measured.

Therefore, in this embodiment, cover layers 6 and 6a of small emissivity are formed on the outside and inside surfaces of a pressure-introducing part 52 of the housing 15 so that the temperature of the gauge portion 51 is not increased due to the influence of the radiation heat.

In accordance with this structure, the high measurement accuracy of the pressure sensor 50 and the air temperature sensor 20 can be achieved, respectively, which in turn can improve the accuracy of flow rate-measurement.

Figure 14:
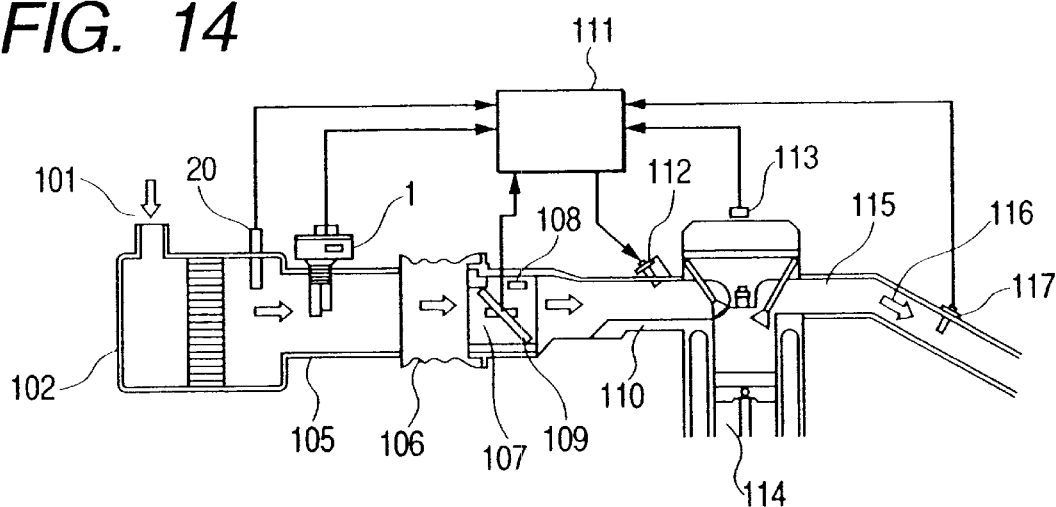
FIG. 14 is a diagram showing the composition of an internal combustion engine system in which an intake-air flow and temperature sensors, according to the present invention, is used.

FIG. 14 shows an embodiment in which sensors according to the present invention are used in an internal combustion engine, and particularly in a gasoline engine. In this embodiment, the flow rate and the temperature of intake-air 101 taken into the engine is detected by the thermal type air flow sensor 1 and the air temperature sensor 20 in the intake-air passage connected to-an intake manifold 110 after the intake-air 101 has passed through an air cleaner 102, a body 105, a duct 106, a throttle angle sensor 107, an idling air-control valve 108, and throttle body 109. Further, the detected signals are input to a control unit 111 in a voltage or frequency signal form, and are used for a combustion system which include injectors 112, a rotational speed meter 113, engine cylinders 114, an exhaust gas manifold 115, exhaust gas 116, an oxygen concentration meter 117, etc., or other engine subsystems.

Meanwhile, the present invention can be applied to a diesel engine, and the fundamental composition, not shown diagrammatically, of the engine including sensors according to the present invention, is almost equal to that of the above gasoline engine. That is, the air flow rate is detected by the thermal type air flow sensor 1 according to the present invention, located between an air cleaner 102 and an intake-air manifold 115 of the diesel engine, and the detected signal is input to a control unit 111. The detailed explanation of this composition is omitted.

Figure 15:
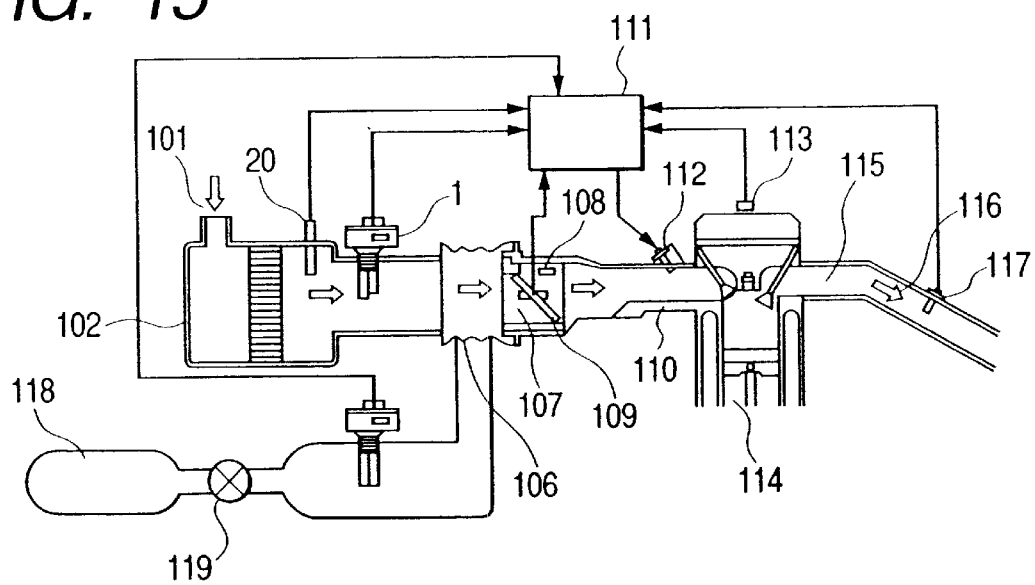
FIG. 15 is a diagram showing the composition of another internal combustion engine system in which the intake-air flow and temperature sensors according to the present invention is used.

FIG. 15 shows an embodiment in which sensors according to the present invention are used in an internal combustion engine, and particularly in a gas engine. In this embodiment, the air flow rate of CNG (compressed natural gas) which is fed from a gas tank 118 which is filled up with CNG, is detected by the thermal type air flow sensor 1 according to the present invention, and the detected signal is input to a control unit 111 in a voltage or frequency signal form, and are used for a combustion system which include injectors 112, a rotational speed meter 113, engine cylinders 114, an exhaust gas manifold 115, exhaust gas 116, an oxygen concentration meter 117, etc., or other engine subsystems.

Figure 16:
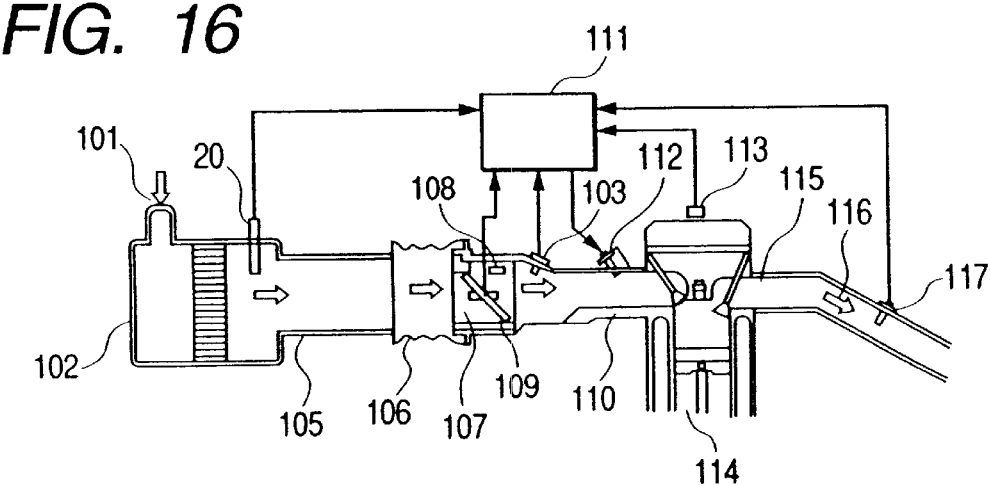
FIG. 16 is a diagram showing the composition of the internal combustion engine system in which the intake-air pressure and temperature sensors according to the present invention is used.

FIG. 16 shows another embodiment in which sensors according to the present invention are used particularly in a gasoline engine. In this embodiment, the pressure and the temperature of intake-air 101 taken into the engine is detected by the pressure sensor 50 and the air temperature sensor 20 in the intake-air passage connected to an intake manifold 110 after the intake-air 101 has passed through an air cleaner 102, a body 105, a duct 106, a throttle angle sensor 107, and an idling air-control valve 108. Further, the detected signals are input to a control unit 111, and are used for a combustion system which include injectors 112, a rotational speed meter 113, engine cylinders 114, an exhaust gas manifold 115, exhaust gas 116, an oxygen concentration meter 117, etc., or other engine subsystems, In the example of the results in the examination of thermal effects in an engine room shown in the table of FIG. 17, the following refers to the date in the EMISSIVITY, Thermal Conductivity and Temp. Increase of Sensor Element Portion columns:

1: EMISSIVITY MEASURED WITH INFRARED THERMOMETER BY HEATING HOUSING AND AUXILIARY PASSAGE STRUCTURE TO 100° C.
2: CALCULATED VALUE OF HOUSING AND AUXILIARY PASSAGE STRUCTURE, COVERED WITH FILM, ASSUMING THAT AVERAGE THICKNESS OF HOUSING MEMBER AND AUXILIARY PASSAGE STRUCTURE MEMBER IS 1.5 mm
3: DIFFERENCE BETWEEN TEMP. OF SENSOR ELEMENT PORTION AND TEMP., OF INTAKE-AIR AT FLOW RATE OF 5 kg/h IN TEST FACILITY SHOWN IN FIG. 5.

Although not shown diagrammatically, the present invention explained in the above embodiments can be applied to sensors (measurement apparatuses) for detecting other physical quantities, such as a gas-component sensor, an oxygen concentration sensor, etc., in addition to an air flow sensor (an air flow-measurement apparatus) and an air temperature sensor.

Further, although not shown diagrammatically, the present invention explained in the above embodiments can be applied to vehicles using an engine system such as an air plane, a ship, a rocket, etc., in addition to a car, Further, although not shown diagrammatically, the present invention explained in the above embodiments can be applied to; an air flow-measurement apparatus including a housing which contains an auxiliary air passage through which a part of air flowing in a resin main air passage passes, a sensor element located in the auxiliary air passage, and a thin metal film covering the whole or a part of the inside surface of the main air passage; or an air flow-measurement apparatus including a housing which contains an auxiliary air passage through which a part of air flowing in a resin main air passage passes, a sensor element located in the auxiliary air passage, and a thin metal film covering the whole or a part of the inside surface of the main air passage, wherein the emissivity of the thin metal film is smaller than that of the material used for the housing.

In accordance with the present invention, even if a sensor is located in thermally severe environment such as that in an engine room of a car, good measurement accuracy. of the sensor can be maintained.

What is claimed is:

1. A flow-measurement apparatus comprising:
   a housing containing an auxiliary gas passage through which a part of gas flowing in a main gas passage passes;
   a sensor element situated in said auxiliary passage; and
   thin films formed on said housing;
   wherein the emissivity of said thin film is smaller than that of said housing.

2. A flow-measurement apparatus according to claim 1, wherein said thin-films are made of metal.

3. A flow-measurement apparatus according to claim 2, wherein said metal thin films are formed by a method selected from a group consisting of a plating method, an evaporation method, and a sputtering method.

4. A flow-measurement apparatus according to claim 2, wherein an average thickness of said respective metal thin films is less than 0.1 mm.

5. A flow-measurement apparatus according to claim 2, wherein each metal thin film is made of a plurality of flakes.

6. A flow-measurement apparatus according to claim 2, wherein a main component of said metal contains at least one metal selected from the group consisting of nickel, gold, copper, aluminum, palladium, platinum, silver, and zinc.

7. A flow-measurement apparatus according to claim 1, wherein said thin films are formed on outer surfaces of said housing, which are parallel with the axis of said main gas passage, and are opposite to each other.

8. An engine system comprising:
   an engine;
   a flow-measurement apparatus according to claim 1;
   fuel-feed means for feeding fuel to said engine; and
   control means for controlling said fuel-feed means based on an output signal of said flow-measurement apparatus;
   wherein the main passage is selected from a group consisting of an air-intake pipe and a bypass passage of said air-intake pipe in said engine.

9. A flow-measurement apparatus comprising:
   a housing containing an auxiliary gas passage through which a part of gas flowing in a main gas passage;
   a sensor element situated in said auxiliary passage; and
   a metal thin film formed on the inside surface of said main gas passage;
   wherein the emissivity of said metal thin film is smaller than that of member composing said housing.

10. An engine system comprising:
    an engine;
    a flow-measurement apparatus according to claim 9;
    fuel-feed means for feeding fuel to said engine; and
    control means for controlling said fuel-feed means based on an output signal of said flow-measurement apparatus;
    wherein the main passage is selected from a group consisting of an air-intake pipe and a bypass passage of said air-intake pipe in said engine.

* * * * *